United States Patent
Kawai

[11] Patent Number: 6,091,323
[45] Date of Patent: Jul. 18, 2000

[54] ALARM APPARATUS FOR ALARMING DRIVER OF VEHICLE AND METHOD OF ALARMING THE SAME

[75] Inventor: Akio Kawai, Kanagawa-ken, Japan

[73] Assignee: Nissan Motor Co., Ltd., Kanagawa-ken, Japan

[21] Appl. No.: 09/058,850

[22] Filed: Apr. 13, 1998

[30] Foreign Application Priority Data

Apr. 18, 1997 [JP] Japan .................................. 9-101530

[51] Int. Cl.⁷ ........................................ B60Q 1/00
[52] U.S. Cl. ............... 340/435; 340/436; 340/461; 340/438; 340/903
[58] Field of Search ................... 340/435, 436, 340/460, 461, 903, 438, 459; 342/70; 701/301; 364/461; 367/909

[56] References Cited

U.S. PATENT DOCUMENTS

| | | | |
|---|---|---|---|
| 5,349,430 | 9/1994 | Yamamoto et al. | 356/5 |
| 5,357,438 | 10/1994 | Davidian | 364/461 |
| 5,453,740 | 9/1995 | Gallagher et al. | 340/903 |
| 5,457,439 | 10/1995 | Kuhn | 340/435 |
| 5,517,196 | 5/1996 | Pakett et al. | 342/70 |
| 5,627,510 | 5/1997 | Yuan | 340/435 |
| 5,646,612 | 7/1997 | Byon | 340/903 |
| 5,699,057 | 12/1997 | Ikeda et al. | 340/937 |
| 5,801,667 | 9/1998 | Shimizu et al. | 345/7 |

FOREIGN PATENT DOCUMENTS

| | | |
|---|---|---|
| 7-242132 | 9/1995 | Japan . |
| 08268113 | 10/1996 | Japan . |
| 2 298 754 | 9/1996 | United Kingdom . |
| WO 95/14939 | 6/1995 | WIPO . |

*Primary Examiner*—Daniel J. Wu
*Assistant Examiner*—Toan Pham
*Attorney, Agent, or Firm*—McDermott, Will & Emery

[57] ABSTRACT

An alarm apparatus for alarming a driver of a vehicle is provided. The alarm apparatus includes a first indicator disposed on a front center console inside the vehicle, a second indicator located in a windshield of the vehicle, a radar unit, a vehicle speed sensor and a controller. In operation, when a distance between the vehicle and the one ahead is less than a first alarm distance, the first indicator is activated to display the alarm. Further, when the distance is less than a second alarm distance smaller than the first alarm distance, the second indicator is activated to display the alarm. Even if the driver does not gaze ahead but the instruments, it is possible for the driver to look at the first indicator activated more frequency than the second indicator, thereafter shift his eyes ahead and finally brake the vehicle after confirming the preceding vehicle with composure.

17 Claims, 8 Drawing Sheets

ALARM APPARATUS FOR ALARMING DRIVER OF VEHICLE AND METHOD OF ALARMING THE SAME

BACKGROUND OF THE INVENTION

The present invention relates to an alarm apparatus for alarming a driver of a vehicle and a method of alarming the same. More particularly, it relates to an alarm apparatus by which the driver of the vehicle is alarmed to his unusual situation with respect to a distance between the vehicle and the one in front. Note, in this specification, the above distance between the vehicle and the one in front may be referred as "inter-vehicle distance", hereinafter.

Conventional art includes an alarm apparatus which automatically detects a distance between a driver's vehicle and the one ahead traveling on the same traffic lane as the preceding vehicle travels by a vehicle radar equipment, establishes a minimum permissible distance from relationships among a vehicle speed, a relative speed between the vehicle and the one ahead and the distance therebetween so as to prevent the vehicle from approaching the preceding vehicle up to a distance required for avoiding the vehicles' collision, and displays a warning or activates an alarm buzzer when the distance between the driver's vehicle and the one ahead reaches the minimum permissible distance.

The above-mentioned conventional art alarm apparatus includes a radar unit for automatically detecting a distance between the driver's vehicle and an object in front, and an alarm-output judging unit which judges whether the distance between the vehicle and the preceding vehicle is within the minimum permissible distance on the basis of a vehicle speed and the distance data obtained by the radar unit and which generates a warning signal if the above judgement is "yes" (within the minimum permissible distance ). The alarm apparatus further includes a display unit which inputs the warning signal from the alarm judging unit to carry out displaying of caution/warning, the accompanying alarm buzzer, a switch for activating or inactivating the alarm apparatus and a vehicle speed sensor for detecting a velocity of the vehicle for the alarm-output judging unit.

In the above-mentioned alarm apparatus, the alarm display and the alarm sound are generated in accordance with the detected "inter-vehicle" distance between the vehicle and the preceding vehicle, the relative velocity therebetween and the velocity of the driver's vehicle, irrespective of conditions of the driver.

Meanwhile, it often happens that the driver temporarily drives the vehicle without paying attention to the forward of the vehicle since he/she manipulates various switches of audio/visual instruments, an air conditioner etc. installed at a center (e.g. a front center console) of an instrument board or he moves his eyes from the front into display panels of the instruments in order to confirm the operating states of the instruments. Under such a driver's condition and if the inter-vehicle distance alarm display or sound is generated, then the driver upon hearing the warning sound moves his eyes ahead in order to confirm the front of the vehicle and thereafter, he begins to brake the vehicle after judging the vehicle is approaching the preceding object (vehicle) too close. Under such a situation, therefore, when the alarm distance is established too short, the driver will have little time required for preventing the collision. Conversely, when the long alarm distance is established upon taking such a situation into consideration, there is a possibility that when the driver drives the vehicle while gazing ahead with care, the alarm sound is made in spite of a sufficient inter-vehicle distance. In such a case, the resulting alarm sound would give the driver a sense of incompatibility or burden.

SUMMARY OF THE INVENTION

It is therefore an object of the present invention to alarm the driver in correspondence with the driver's sight (eyes) appropriately.

Another object of the invention is to provide an alarm apparatus which includes an indicator arranged in such a position that the driver gazing ahead can confirm it and another indicator arranged at the center of the instrument board and which advances a timing of alarm by the later indicator in comparison with the timing of alarm by the former indicator by a period required for the driver's moving the sight to the forward and confirming the preceding object.

The above objects of the present invention described above can be accomplished by an alarm apparatus for alarming a driver of a vehicle, the alarm apparatus comprising:

a first indicator disposed inside the vehicle, calling attention of the driver through a driver's sight;

a second indicator located inside the vehicle, calling attention of the driver through a driver's sight, the second indicator being placed closer to the driver's sight than the first indicator under condition that the driver is facing ahead of the vehicle;

a detector detecting a condition to call attention of the driver; and a controller activating the first indicator more frequently than the second indicator when the condition is detected by the detector.

In operation, as mentioned above, the first indicator is activated more frequently than the second indicator placed closer to the driver's sight than the first indicator. Therefore, with an arrangement of the first indicator in the vicinity of instruments that the driver is apt to gaze during driving the vehicle, even if the driver does not gaze ahead but the instruments, it is possible for the driver to look at the first indicator activated more frequency than the second indicator, thereafter shift his eyes ahead and finally brake the vehicle after confirming the preceding vehicle with composure.

In the present invention, preferably, the controller activates the first indicator before the controller activates the second indicator.

In the present invention, preferably, the detector detects a distance between the vehicle and another vehicle in front of the vehicle; and the controller activates the first indicator when the distance from the other vehicle is smaller than a predetermined distance.

More preferably, the detector detects that the distance from the other vehicle is smaller than a first distance, detecting that the distance from the other vehicle is smaller than a second distance which is smaller than the first distance; and the controller activates the first indicator when the distance is smaller than the first distance and activates the second indicator when the distance is smaller than the second distance.

More preferably, the first indicator and the second indicator inform the driver that the vehicle is too close to the other vehicle in front of the vehicle.

It is also preferable that the first indicator is disposed on a front center console inside the vehicle.

Alternatively, it is also preferable that the first indicator is disposed on a device which is disposed on a front center console of the vehicle.

In the above-mentioned arrangement, the device may include an operation device to operate the device. Then, the controller activates the first indicator when the operation device is operated and the condition to alarm is detected by the detector.

Alternatively, the device may includes any one of a car audio, a navigation system, a controller of an air conditioner and a clock.

In the present invention, preferably, the second indicator includes a part of a windshield of the vehicle, the part being located in front of the driver.

Alternatively, the second indicator may be placed on a meter cluster.

It is preferable that the alarm apparatus further comprises a buzzer connected to the controller, while the controller activates the buzzer when the controller activates the first indicator.

In case of further comprising the buzzer connected to the controller, alternatively, the controller may activate the buzzer when the controller activates the second indicator.

According to the invention, there is also provided a method of alarming a driver of a vehicle, comprising the steps of:

detecting a condition to call attention of the driver;

calling attention of the driver by a first indicator which is disposed in the vehicle at first; and calling attention of the driver by a second indicator, the second indicator being located inside the vehicle and placed closer to the driver's sight than the first indicator under condition that the driver is facing ahead of the vehicle.

The above and other features and advantages of this invention will become apparent, and the invention itself will best be understood, from a study of the following description and appended claims, with reference had to the attached drawings showing a preferred embodiment of the invention.

DESCRIPTION OF THE PREFERRED EMBODIMENT

A variety of embodiments of the present invention will be described with reference to the drawings. Japanese patent application serial No. 9-101530 is incorporated by reference herein.

Figure 1:
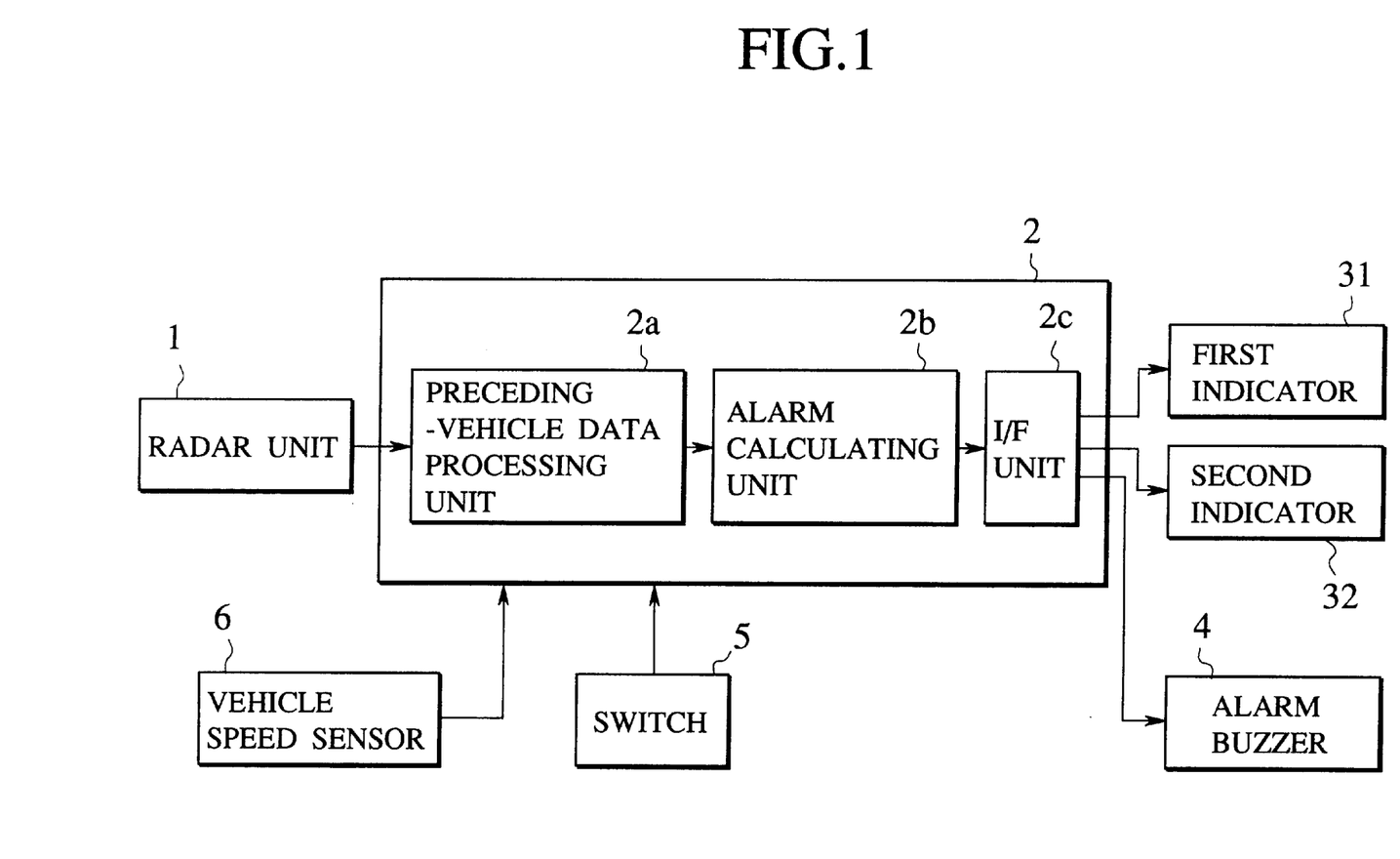
FIG. 1 is a block diagram showing a constitution of an alarm apparatus in accordance with a first embodiment of the present invention.
Figure 2:
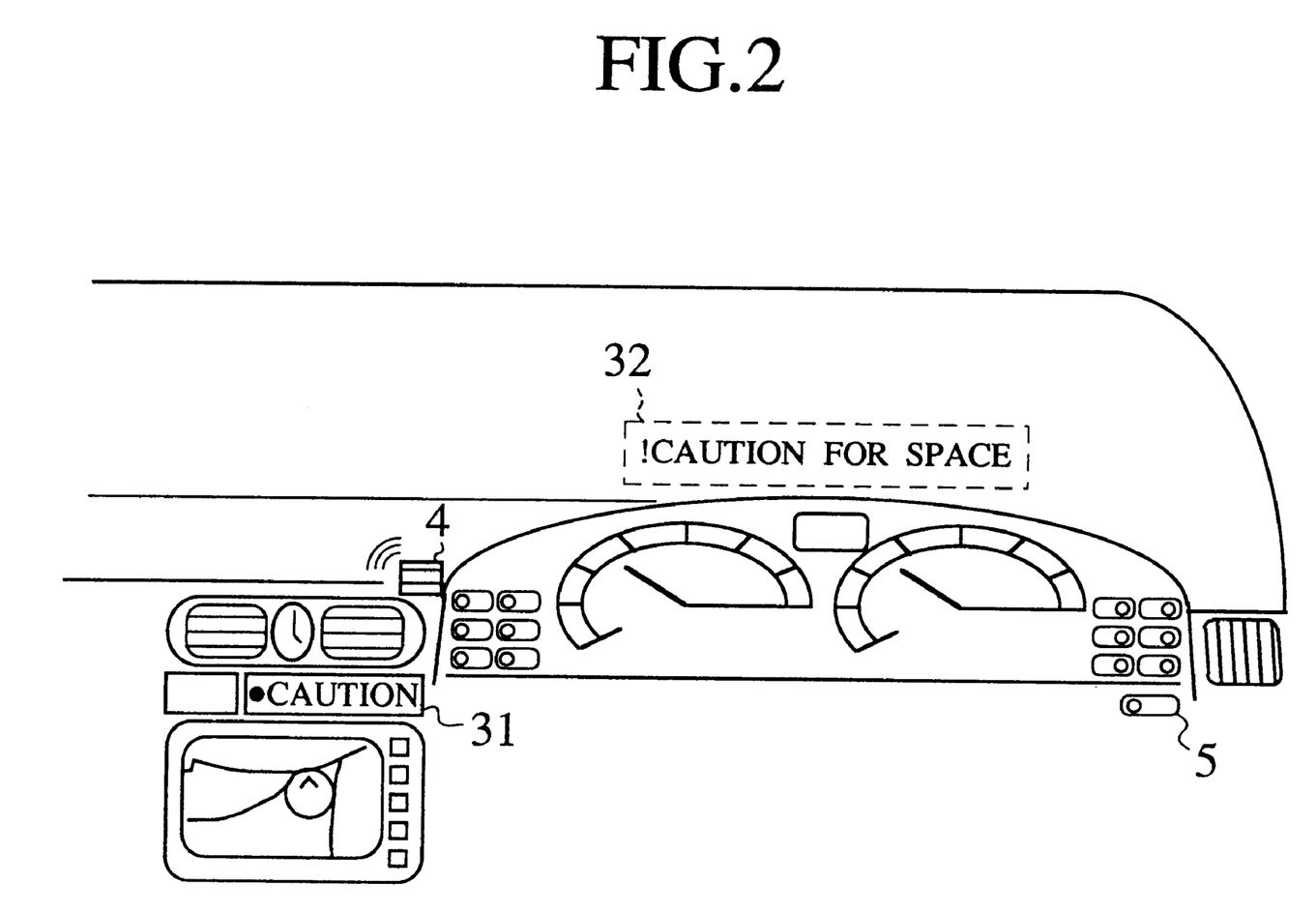
FIG. 2 is a front view of an instrument board of the alarm apparatus of the first embodiment.

FIGS. 1 and 2 show a constitution of a "vehicle-distance" alarm apparatus in accordance with the first embodiment of the present invention.

The alarm apparatus of the embodiment includes a radar unit 1, an alarm buzzer 4, a switch 5 and a vehicle speed sensor 6. As features of the invention, the alarm apparatus further includes an alarm-output judging device 2, a first indicator 31 for displaying a first alarm by means of lighting a lamp and a second indicator 32, such as a head-up display, for displaying a second alarm. In arrangement, the first indicator 31 is disposed at a center of an instrument board or a front center console inside the vehicle and also positioned in a driver's viewpoint in seeing or manipulating audio/visual instruments, a navigation system, a clock or the like. On the other hand, the second indicator 32 arranged in a position where the driver, who is driving the vehicle while seeing forward, is capable of watching the indicator 32 without taking his/her eyes off the forward.

The alarm-output judging device 2 comprises a preceding-vehicle data processing unit 2a for processing distance data against various objects existing in front, which have been outputted from the radar unit 1, and extracting distance data D about the preceding vehicle traveling on the same traffic lane, an alarm calculating unit 2b which judges whether the present distance between the vehicle and the one in front is proper, on the basis of the distance data D extracted by the unit 2a and vehicle speed data Vf obtained by the vehicle speed sensor 6 while using a predetermined algorism mentioned later. An interface (I/F) unit 2c for outputting an alarm signal generated from the unit 2b to the first and second indicators 31, 32 and the alarm buzzer 4.

According to the embodiment, considering a time t2 necessary for the driver to 1) his/her first noticing of an alarm display on the first indicator 31 at the center of the instrumental board, 2) shifting his/her eyes to the forward, 3) seeing the preceding vehicle, 4) starting to brake the vehicle, a first alarm distance L1 relating to the first vehicle-distance alarm is established in order to display an alarm earlier than usual. Similarly, a second alarm distance L2 relating to the second vehicle-distance alarm is established in order to display an alarm on the second indicator 32 ahead of the driver. earlier than usual. These distances L1 and L2 are determined by the following expressions (1) and (2):

$$L1 = Vf \cdot (t1+t2) + (Vf^2 - Va^2)/2\alpha \quad (1)$$

$$L2 = Vf \cdot t1 + (Vf^2 - Va^2)/2\alpha \quad (2)$$

wherein, Vf is a velocity of the driver's vehicle, Va: a velocity of the preceding vehicle, t1: a response time of the driver, t2: a shifting time of the driver's eyes, and α is a deceleration of the driver's vehicle.

Figure 3:
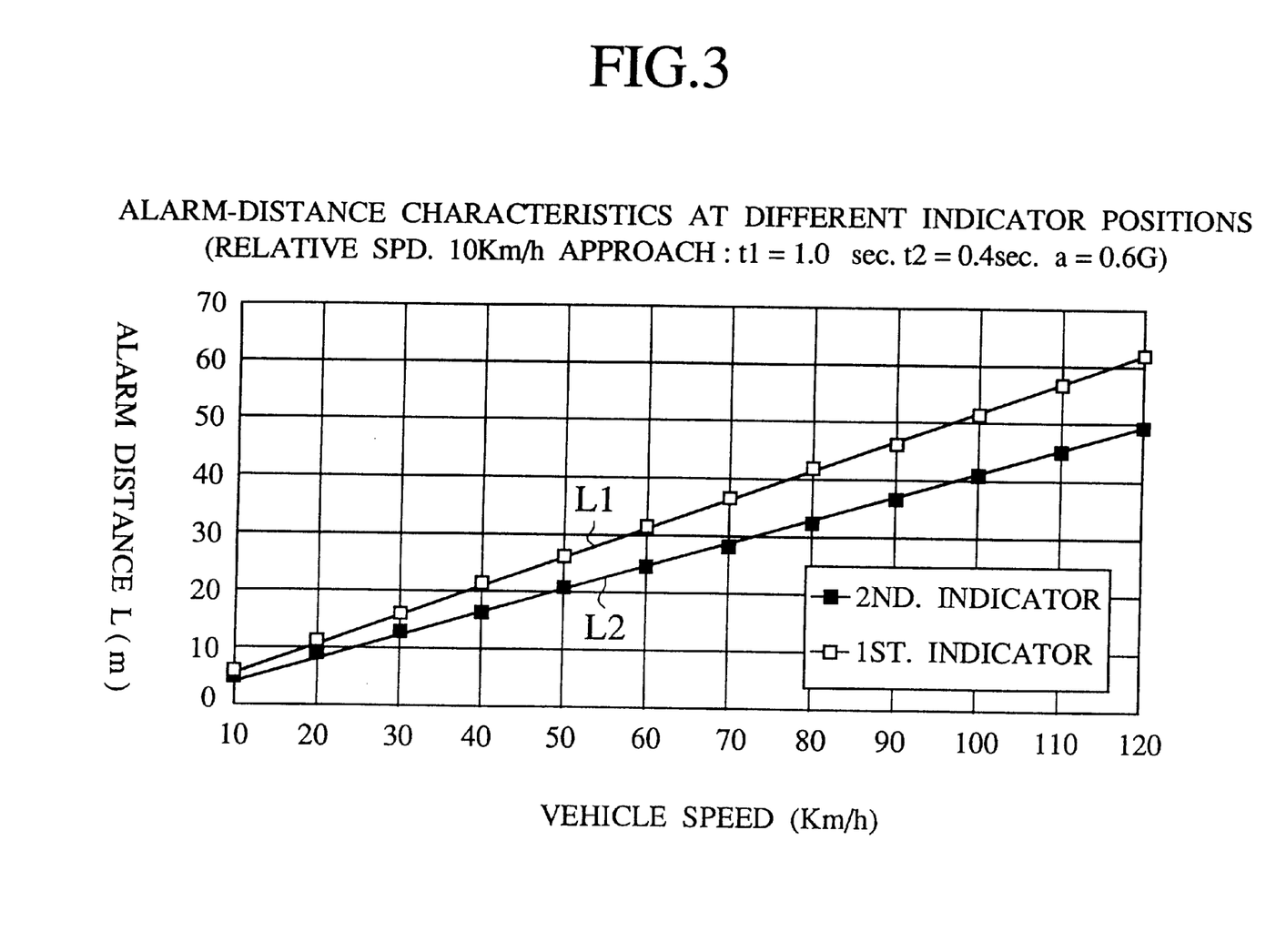
FIG. 3 is a diagram showing relationships among vehicle speed, a first alarm distance and a second alarm distance established in the alarm apparatus of the first embodiment.

As an example of the alarm distance characteristics depending on the indicator positions, a diagram as shown in FIG. 3 is provided by the calculation on the basis of the above expressions (1) and (2). The shown characteristics is concerned with the case of approach of the vehicle to the one ahead at relative velocity of 10 km/h. Further, the diagram of FIG. 3 is obtained under conditions of response time t1=1 sec.; shifting time t2=0.4 sec.; and decelerating velocity α=0.6 G.

Referring to the diagram, it will be found that, when the driver's vehicle is traveling at Vf of 50 km/h while the preceding vehicle is traveling at Va of 40 km/h, that is, in case of approach of the vehicles to each other at relative velocity of 10 km/h, the first alarm distance L1 of 25 m for the first indicator 31 is established in order to output the alarm earlier to the usual alarm distance (conventional distance) of 20 m, while the second alarm distance L2 of 20 m for the second indicator 32 is established as similar to that of the conventional apparatus. Consequently, when the practical distance between the vehicle and the one ahead is reduced less than the first alarm distance L1, then the vehicle-distance alarm is displayed on the first indicator 31 and the alarm buzzer 4 is activated simultaneously. While, when the practical distance between the vehicle and the one ahead is reduced less than the second alarm distance L2, then the vehicle-distance alarm is displayed on the second indicator 32.

Figure 4:
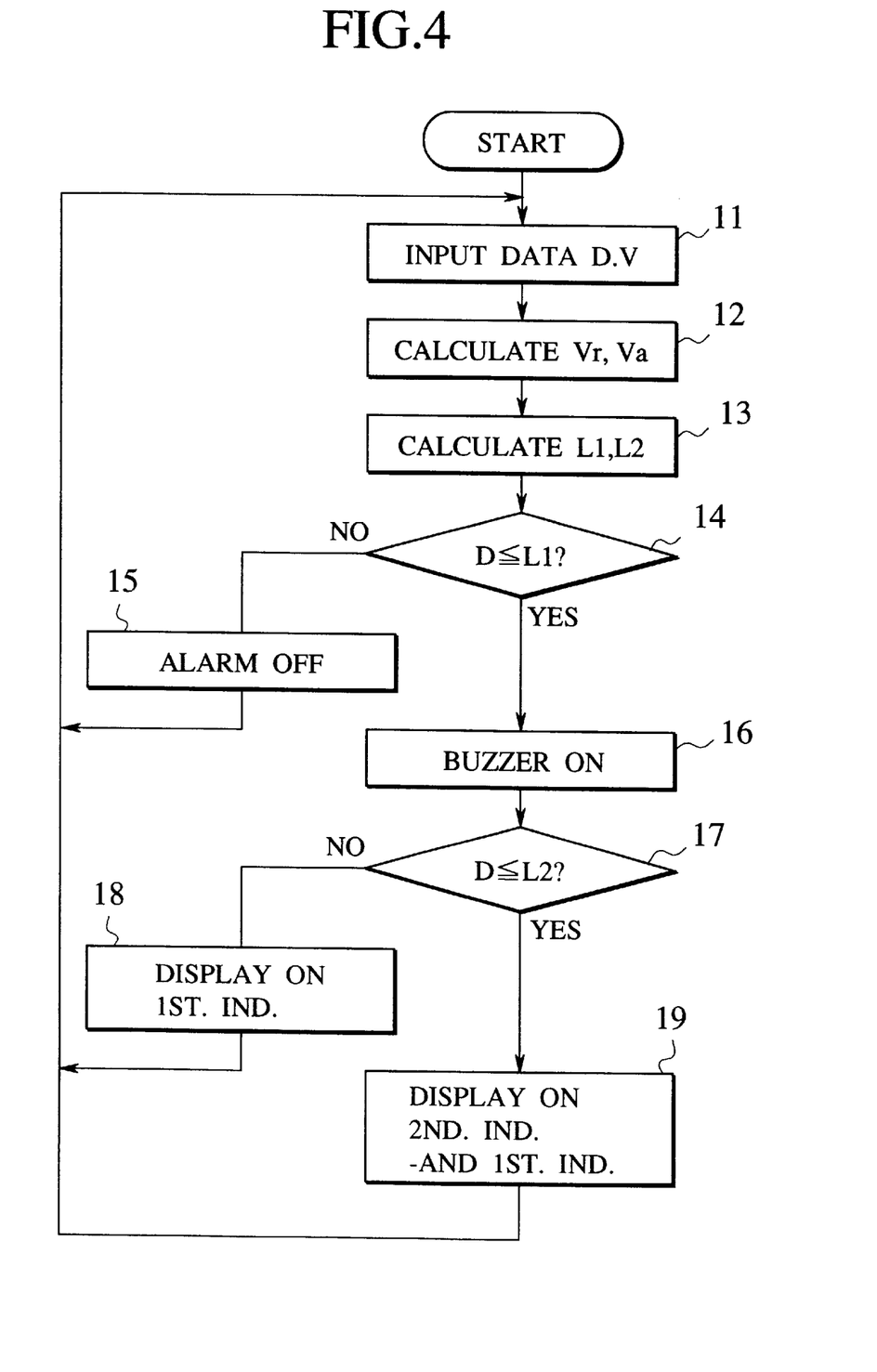
FIG. 4 is a flow chart of an operation of the alarm apparatus of the first embodiment.

We now describe an operation of the alarm-output judging device 2 with reference to a flow chart of FIG. 4. Note, a system for executing the following steps is energized at the same time of starting an engine of the vehicle.

When the distance data of the forward objects detected by the radar unit 1 is cyclically inputted to the alarm-output judging device 2, then the preceding-vehicle data processing unit 2a extracts the distance data D concerned with the preceding vehicle traveling on the same traffic lane and outputs it at step 11. (note: as this processing method itself, a variety of known methods may be employed) Additionally, at step 11, it is also executed to input the vehicle's velocity Vf by processing velocity-pulses generated from the vehicle speed sensor 6.

At sequent step 12, the relative velocity Vr between the vehicle and the preceding vehicle is calculated by the time integration of the inputted distance data D and the velocity of the preceding vehicle is also calculated by a formula of Va=Vf−Vr.

Next, at step 13, it is executed to calculate the first alarm distance L1 and the second alarm distance L2 on the basis of the expressions (1) and (2), by the alarm calculating unit 2b. According to the embodiment, upon adopting the characteristics shown in FIG. 3, the alarm-display timing on the first indicator 31 at the center of the instrument board is established so as to be in advance of that on the second indicator 31 operating as a "head-up display" unit by 0.4 sec.

At step 14, it is judged whether the actual distance D is within the range of the first alarm distance L1 or not. If the judgement at step 11 is NO, that is, the distance D is more than the first alarm distance L1, then the routine goes to step 15 where it is executed to either maintain the alarm buzzer 4 in its inactivated condition or cease displaying of the alarm and operating the alarm buzzer 4, because a safe distance between the vehicle and the one ahead is being maintained at present. On the contrary, if the judgement at step 14 is YES, that is, when the distance D is equal to or less than the first alarm distance L1, then the routine goes to step 16 where it is executed to buzz by outputting the alarm signal from the unit 2b to the alarm buzzer 4 via. the I/F unit 2c.

Subsequently to step 17, it is judged whether the actual distance D is equal to or less than the second alarm distance L2 at step 17. When the judgement at step 17 is No, that is, when the distance D is more than the second alarm distance L2 despite that the distance D is equal to or less than the first alarm distance L1, then the routine goes to step 18 where the alarm is displayed on the first indicator 31 by outputting the display signal from the unit 2b to the indicator 31 via. the I/F unit 2c.

On the contrary, when the judgement at step 17 is YES, that is, when the distance D is equal to or less than the second alarm distance L2, then the routine goes to step 19 where both the first indicator 31 and the second indicator 32 are activated to display the warning indications. Note, the warning indication on the second indicator 32 may be accomplished by projecting a phrase e.g. "! CAUTION for SPACE" on a front windshield of the vehicle, as shown in FIG. 2.

In this way, as the second alarm distance L2, the alarm apparatus in accordance with the first embodiment of the invention has a small threshold "inter-vehicle" distance in such a manner that the present inter-vehicle distance can be increased with safe when the driver watching ahead visually notices the alarm display without turning his eyes and then brakes the vehicle. Furthermore, as the first alarm distance L1, the alarm apparatus of the embodiment further includes another large threshold "inter-vehicle" distance established so as to ensure a period required for even a so-called "forward-inattention" driver, who gazes or manipulates the instruments at the center of the dashboard, to notice the warning about the inter-vehicle distance visually, sequentially turn his/her eyes to the forward immediately, confirm the preceding vehicle and finally brake the vehicle.

With the establishment of the distances L2 and L1, according to the alarm apparatus of the embodiment, when the distance D becomes to be equal to or less than the first alarm distance L1, the alarm buzzer 4 and the first indicator 31 at the center of the instrument board is both activated. Further, when the distance D becomes to be equal to or less than the second alarm distance L2, the second indicator 32 is also activated together with the first indicator 31. Accordingly, even if the driver's vehicle approaches the preceding vehicle while he/she turns his/her eyes from the forward temporarily and gaze the center instruments, the driver can expand the inter-vehicle distance with composure in spite of time consumption of the driver's hearing or looking at the alarm, thereafter shifting his eyes ahead and finally braking the vehicle on confirming the preceding vehicle. On the other hand, in case that the driver drives the vehicle while gazing ahead, he/she is able to look the display on the second indicator 32 on the front windshield without moving his eyes when the vehicle approaches the preceding vehicle up to the second alarm distance L2 and he can carry out the braking operation of the vehicle. Thus, it is possible to prevent the driver from feeling out of place or feeling burden due to deviations in drive feeling caused by the earlier alarm.

Figure 5:
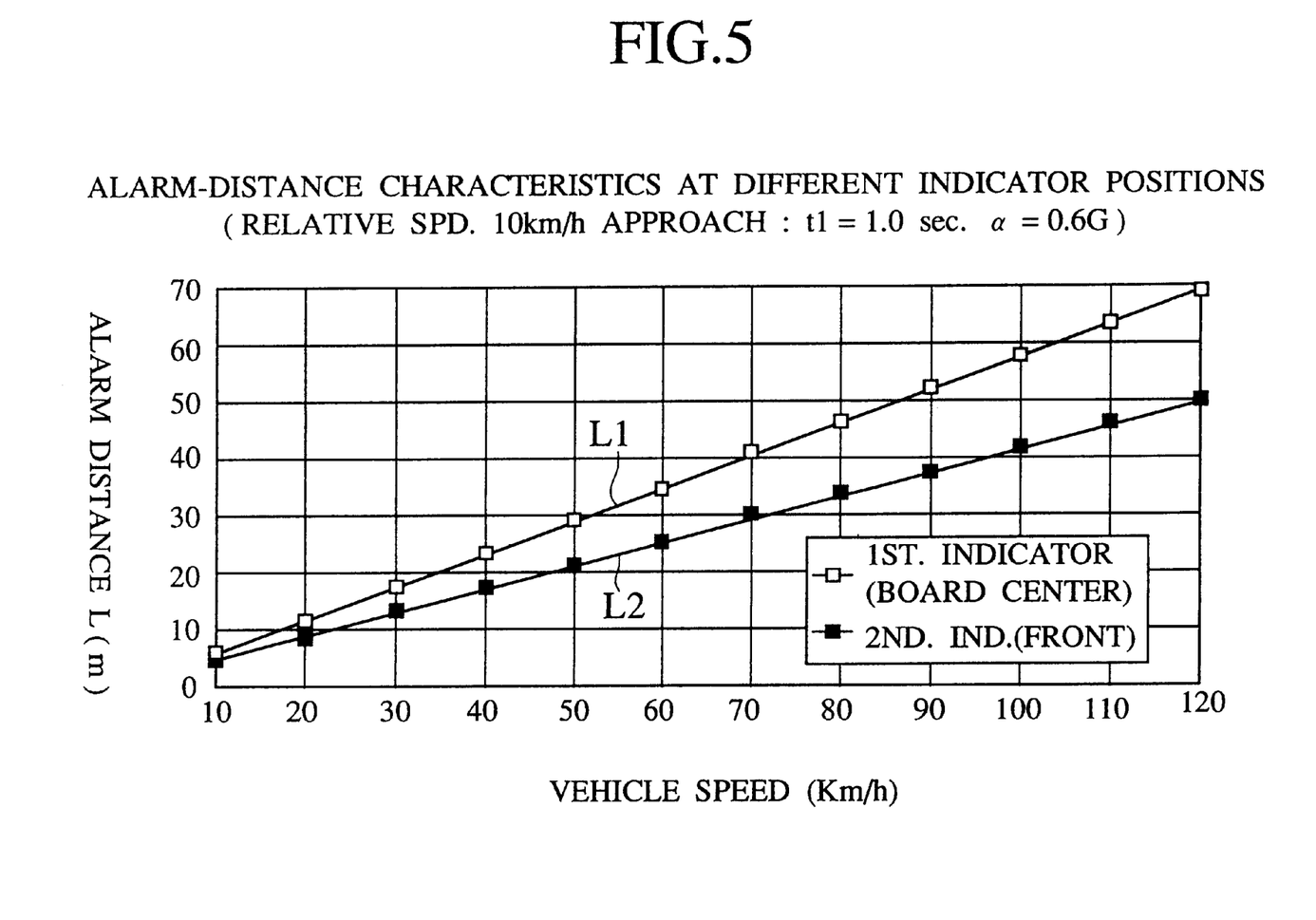
FIG. 5 is a diagram showing relationships among vehicle speed, a first alarm distance and a second alarm distance established in an alarm apparatus in accordance with a second embodiment.

We now describe the second embodiment of the invention with reference to FIG. 5. The alarm apparatus of the second embodiment is characterized by adopting the following expressions (3), (4) in place of the above-mentioned expressions (1), (2) for calculating the first and second alarm distances L1, L2 by the preceding-vehicle data processing unit 2a of the alarm-output judging device 2 of the first embodiment of FIGS. 1 and 2. Other constituents of the alarm apparatus of this embodiment are common with those of the first embodiment, respectively.

$$L1 = k1 \cdot \{Vf \times t1 + (Vf^2 - Va^2)/2\alpha\} \quad (3)$$

$$L2 = k2 \cdot \{Vf \times t1 + (Vf^2 - Va^2)/2\alpha\} \quad (4)$$

where, Vf is the velocity of the driver's vehicle, Va: the velocity of the preceding vehicle, t1: the response time, coefficient k1:1.4 (for the first alarm distance), coefficient k2:1.0 (for the second alarm distance), and α is the decelerating velocity of the driver's vehicle.

As an example of the alarm distance characteristics depending on the indicator positions, a diagram as shown in FIG. 5 is provided by the calculation on the basis of the above expressions (3) and (4). The shown characteristics is concerned with the case of approaching the vehicle to the one ahead at relative velocity of 10 km/h, too. Further, the diagram of FIG. 5 is obtained under conditions of response time t1=1 sec.; and decelerating velocity α=0.6 G.

Referring to the diagram, it will be found that, when the driver's vehicle is traveling at Vf of 50 km/h while the preceding vehicle is traveling at Va of 40 km/h, namely, in case of approaching the vehicles to each other at relative velocity of 10 km/h, the first alarm distance L1 for the first indicator 31 is set to 28 m for outputting the alarm earlier to the usual alarm distance (conventional distance) of 20 m, while the second alarm distance L2 of 20 m for the second indicator 32 is established as similar to that of the conventional apparatus.

In the second embodiment, the first alarm distance L1 is defined as a standard for stimulating the driver's attention to the inter-vehicle distance, while the second alarm distance L2 is defined as another standard for stimulating to decelerate the vehicle. In operation, as similar to the first embodiment, when the actual inter-vehicle distance D is equal to or less than the first alarm distance L1, the "inter-vehicle" distance warning is displayed on the first indicator 31 while buzzing the buzzer 4. While, when the actual inter-vehicle distance D is equal to or less than the second alarm distance L2, the "inter-vehicle" distance warning is displayed on the second indicator 32.

In this way, according to the second embodiment, the warning has been indicated on the first indicator 31 at the center of the instrument panel 1 since an inter-vehicle distance longer than that in case of the "head-up" type second indicator 32 by 40%. Thus, as similar to the first embodiment, even when the driver gazes the center of the instruments panel, it is possible for the driver to hear or look at the alarm, thereafter shift his eyes ahead and finally brake the vehicle with composure. Moreover, under condition that the driver drives the vehicle while gazing ahead, the inter-vehicle distance warning is displayed on the second indicator 32 when the vehicle approaches the preceding vehicle up to the second alarm distance L2. Thus, it is possible to prevent the driver from feeling out of place.

Although the second indicator 32 is illustrated as the head-up display unit in common with the first and second embodiments, the other display means would be applicable in a modification if only it can be disposed in a position where it comes in sight of the driver driving the vehicle while gazing ahead with care. For example, an indicator lamp (not shown) may be substituted for the second indicator 32, being installed in a front and upper part of the instrument board where a speed meter and the other meters (i.e. a meter cluster) are arranged. Of course, values in parameters of the expressions (1) to (4) are not limited to those of the shown embodiments, so that the establishment in values may be modified under situation.

Next, the third embodiment of the invention will be described with reference to FIGS. 6 to 9.

Figure 6:
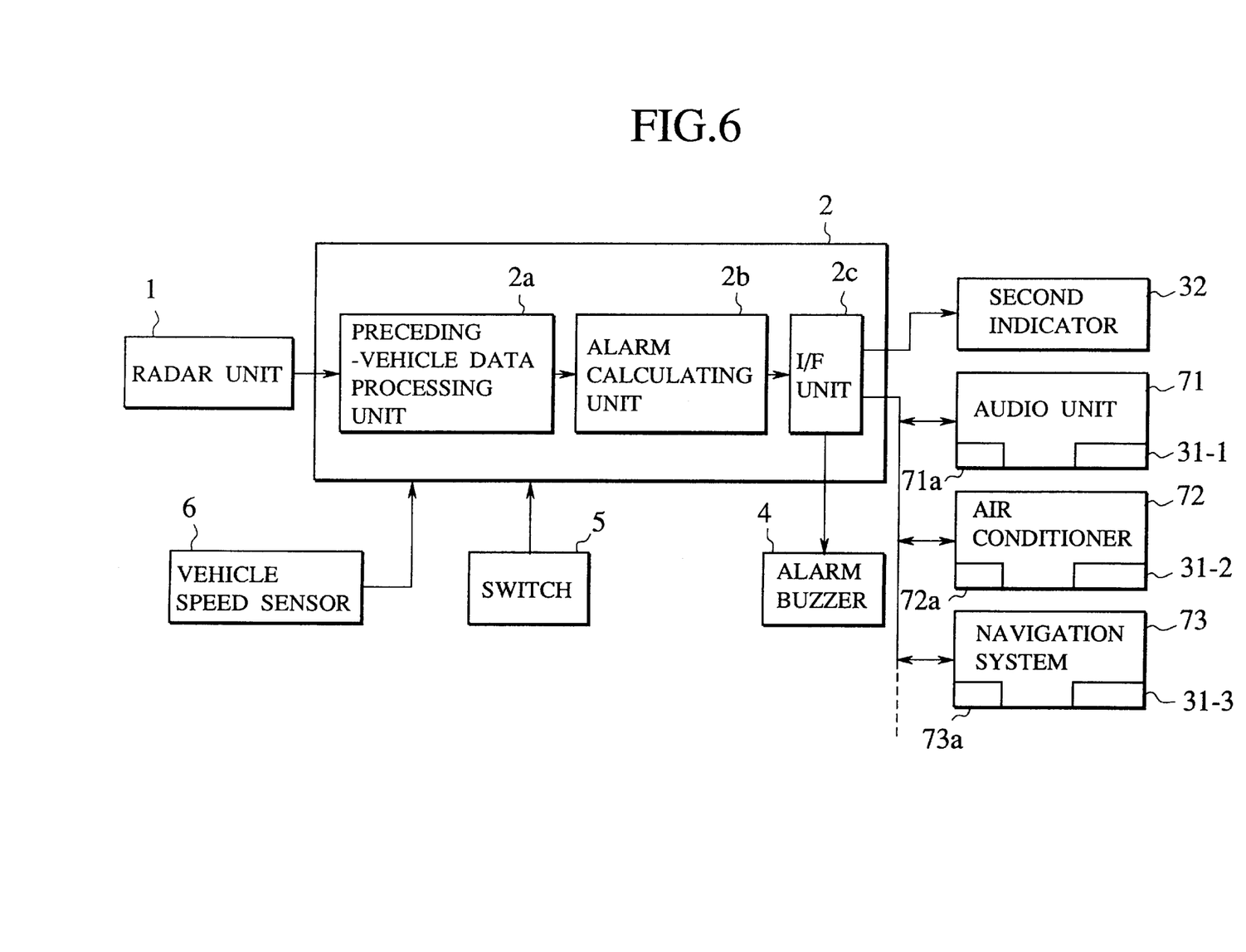
FIG. 6 is a block diagram showing a constitution of an alarm apparatus in accordance with a third embodiment of the present invention.
Figure 7:
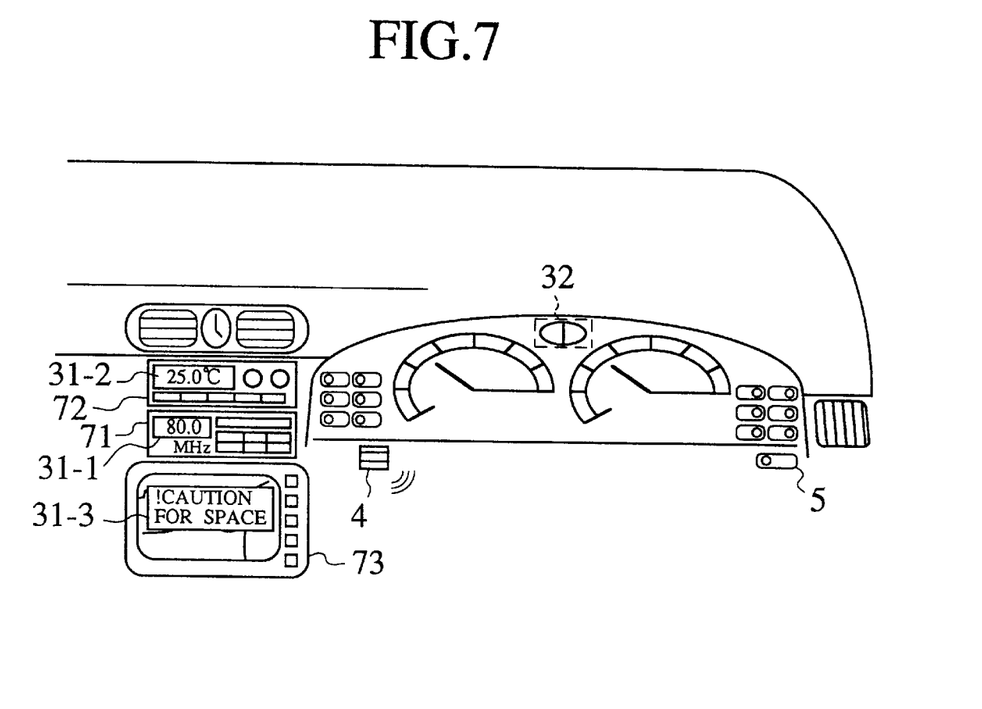
FIG. 7 is a front view of an instrument board of the alarm apparatus of the third embodiment.
Figure 8:
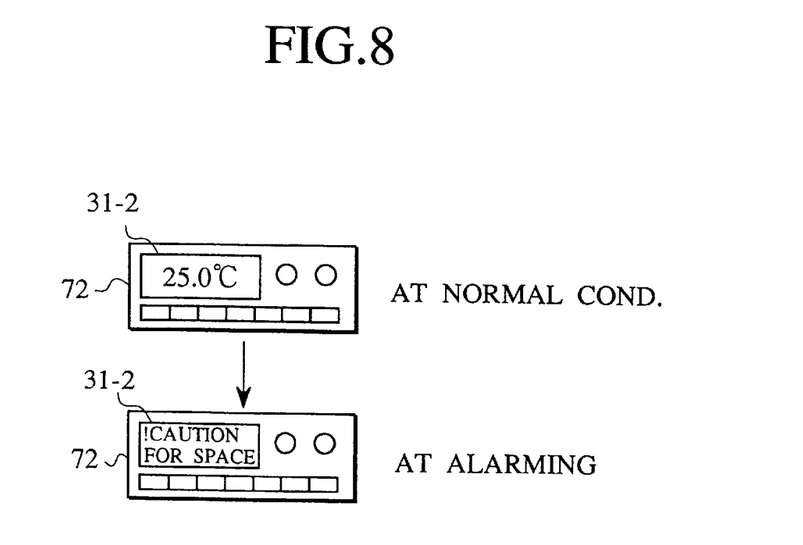
FIG. 8 is an explanatory diagram of an air conditioner operated by the alarm apparatus of the third embodiment.

Commonly with the afore-mentioned first and second embodiments, the first indicator 31 as a new element is arranged at the center of the instrument board. On the contrary, in the third embodiment, the first indicator 31 is substituted by first indicator parts 31-1, 31-2, 31-3 originally installed in an audio instrument 71, an air-conditioner 72 and a navigation system 73 respectively, all of which are arranged at the center of the instrument board. Of course, in this case, a function to display "! CAUTION for SPACE" must be installed in each of the first indicator parts 31-1, 31-2, 31-3. Further, the audio instrument 71, the air-conditioner controller 72 and the navigation system 73 are provided with manipulation detecting switches 71a, 72a, 73a for detecting the driver's manipulations, respectively. Respective manipulation detecting signals from the switches 71a to 73a are inputted into the alarm-output judging device 2.

In operation, when the alarm-output judging device 2 judges the inter-vehicle distance D equal to or less than the first alarm distance L1 during the driver's manipulating the navigation system 73, the device 2 causes the navigation system 31 to display "! CAUTION for SPACE" on the first indicator part 31-3, on the basis of the signal outputted from the switch 73a. Alternatively, when the alarm-output judging device 2 judges the inter-vehicle distance D equal to or less than the second alarm distance L2 during the driver's manipulating the air conditioner 72, the device 2 causes the conditioner 72 to display "! CAUTION for SPACE" on the first indicator part 31-2, on the basis of the signal outputted from the switch 72a.

Figure 9:
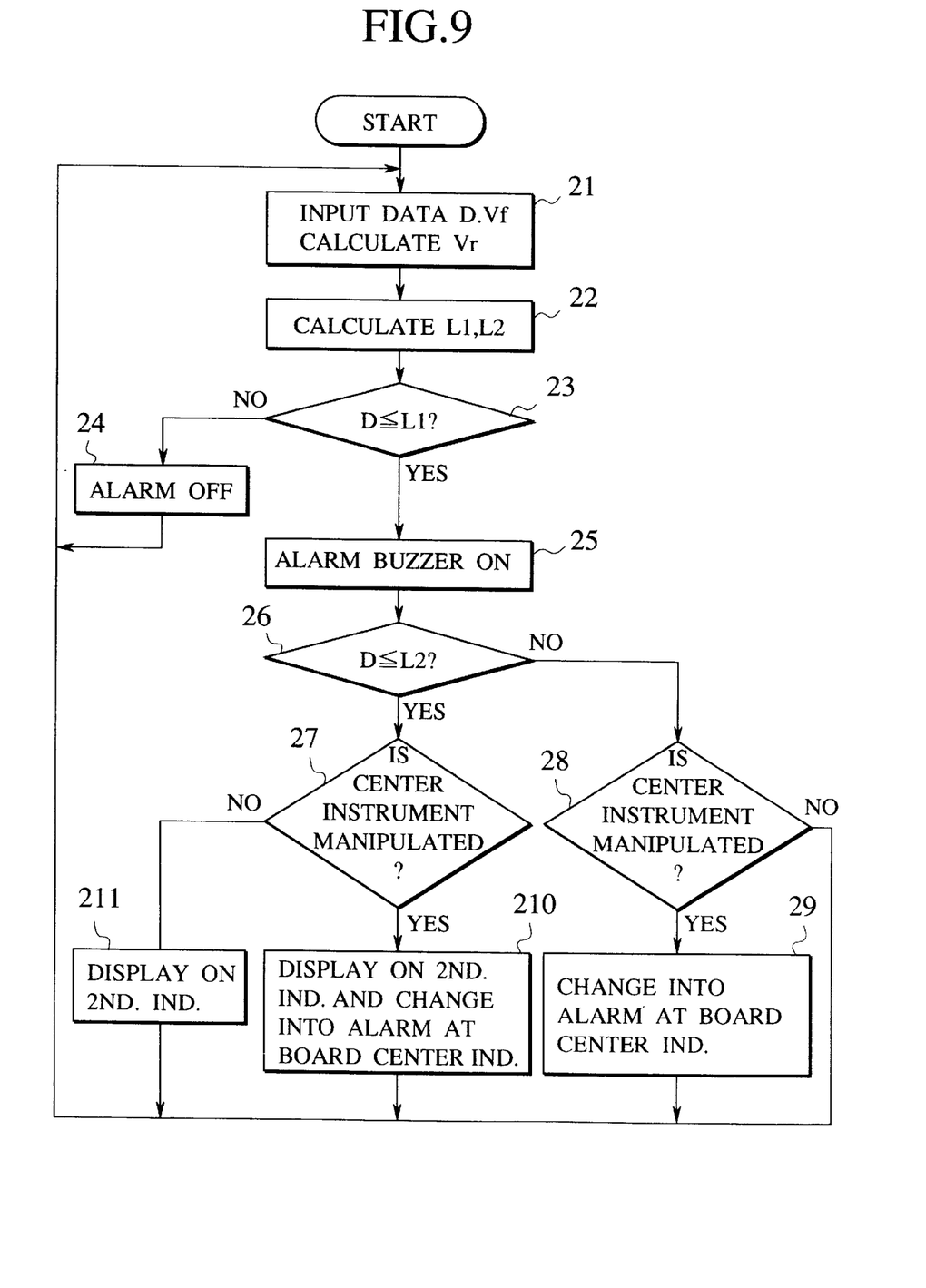
FIG. 9 is a flow chart of an operation of the alarm apparatus of the third embodiment.

We now describe an operation of the alarm apparatus of the third embodiment with reference to a flow chart of FIG. 9.

As similar to steps 11, 12 in the flow chart of FIG. 4, it is executed to input the distance data D and the vehicle's velocity Vf and calculate the relative velocity Vr between the vehicle and the preceding vehicle at step 21. At next step 22, it is executed to calculate the first alarm distance L1 and the second alarm distance L2. At step 23, it is judged whether the actual distance D is equal to or less than the first alarm distance L1. If the judgement at step 23 is NO, that is, the distance D is more than the distance L1, then the routine goes to step 24 where it is executed to either maintain the alarm buzzer 4 in its inactivated condition or cease displaying of the alarm and operating the alarm buzzer 4, because a safe distance between the vehicle and the one ahead is being maintained at present. On the contrary, if the judgement at step 23 is YES, that is, when the distance D is equal to or less than the first alarm distance L1, then the routine goes to step 25 where it is executed to buzz the alarm buzzer 4.

Subsequently to step 25, it is judged whether the actual distance D is equal to or less than the second alarm distance L2 at step 26. When the judgement at step 26 is No, that is, when the distance D is more than the second alarm distance L2 despite that the distance D is equal to or less than the first alarm distance L1, then the routine goes to step 28 where it is judged whether any one of the above-mentioned instruments 71 to 73 is being manipulated by detecting the signals from the switches 71a to 73a. When it is judged that any one of the instruments 71 to 72 is under manipulation, then the routine goes to step 29 where the first display part of the instrument manipulated is activated to display "! CAUTION for SPACE". Conversely, when the judgement at step 28 is NO, the inter-vehicle distance warning, i.e. "! CAUTION for SPACE", is not displayed on all of the instruments 71 to 73 at the center of the instrument board but buzzing the buzzer 4 since the driver is gazing ahead with care and therefore, there is no need to give him the warning in advance.

Returning to step 26, when the distance D is equal to or less than the second alarm distance L2, the routine goes to step 27 where it is judged whether any one of the above-mentioned instruments 71 to 73 is being manipulated by detecting the signals from the switches 71a to 73a. When it is judged that any one of the instruments 71 to 72 is under manipulation, then the routine goes to step 210 where both of the first display part of the instrument manipulated and the second indicator 32 are activated to display "! CAUTION for SPACE".

On the contrary, when the judgement at step 27 is NO, then the routine goes to step 211 where only the second indicator 32 is activated to display the warning thereon.

In this way, according to the third embodiment, when the distance D is equal to or less than the first alarm distance L1 during the driver's manipulating any one of the instruments installed at the center of the instrument board, the display part of the instrument under manipulation is activated to display the inter-vehicle distance warning, operating as the first indicator. Consequently, it is possible to cause the driver to visually confirm the warning certainly. Furthermore, in this case, the warning is generated under the inter-vehicle distance which is established longer than the conventional "warning" distance by a distance corresponding to a period required for the driver's shifting his eyes ahead, sequent confirming the preceding vehicle and finally starting to brake the vehicle. Thus, the driver can carry out manipulation to increase the inter-vehicle distance with composure, so that the safety in driving the vehicle can be further improved.

Note, also in the third embodiment, the first and second alarm distances L1 and L2 should be established under the actual situation, as similar to the first and second embodiments. Additionally, values in parameters of the expressions are not limited to those of the shown embodiments, so that the establishment in values may be modified under situation.

Finally, it will be understood by those skilled in the art that the foregoing description is preferred embodiments of the disclosed alarm apparatus, and that various changes and modifications may be made to the present invention without departing from the spirit and scope thereof.

What is claimed is:

1. An alarm apparatus for alarming a driver of a vehicle, the alarm apparatus comprising:
    a first visual indicator disposed inside the vehicle, calling attention of the driver through a driver's sight;
    a second visual indicator located inside the vehicle, calling attention of the driver through a driver's sight, the second visual indicator separated and spaced from the first visual indicator, the second visual indicator being placed closer to the driver's sight than the first visual indicator under condition that the driver is facing ahead of the vehicle;
    a detector detecting a condition to call attention of the driver; and
    a controller activating the first visual indicator more frequently than the second visual indicator when the condition is detected by the detector.

2. The alarm apparatus of claim 1, wherein the controller activates the first visual indicator before the controller activates the second visual indicator.

3. The alarm apparatus of claim 1, wherein the detector detects a distance between the vehicle and another vehicle in front of the vehicle; and
    the controller activates the first visual indicator when the distance from the other vehicle is smaller than a predetermined distance.

4. The alarm apparatus of claim 3, wherein the detector detects that the distance from the other vehicle is smaller than a first distance, detecting that the distance from the other vehicle is smaller than a second distance which is smaller than the first distance; and
    the controller activates the first visual indicator when the distance is smaller than the first distance and activates the second visual indicator when the distance is smaller than the second distance.

5. The alarm apparatus of claim 3, wherein the first visual indicator and the second visual indicator inform the driver that the vehicle is to close to the other vehicle in front of the vehicle.

6. The alarm apparatus of claim 1, wherein the first visual indicator is arranged within an area of a front center console inside the vehicle.

7. The alarm apparatus of claim 1, wherein the first visual indicator is disposed on a device which is arranged within an area of a front center console of the vehicle.

8. The alarm apparatus of claim 7, wherein the device includes an operation device to operate the device; and
    the controller activates the first visual indicator when the operation device is operated and the condition to alarm is detected by the detector.

9. The alarm apparatus of claim 8, wherein
    the device includes a car audio.

10. The alarm apparatus of claim 8, wherein
    the device includes a navigation system.

11. The alarm apparatus of claim 8, wherein
    the device includes a controller of an air conditioner.

12. The alarm apparatus of claim 8, wherein
    the device includes a clock.

13. The alarm apparatus of claim 1, wherein the second visual indicator includes a part of a windshield of the vehicle, the part being located in front of the driver.

14. The alarm apparatus of claim 1, wherein the second visual indicator is placed on a meter cluster.

15. The alarm apparatus of claim 1, further comprising: a buzzer connected to the controller; wherein the controller activates the buzzer when the controller activates the first visual indicator.

16. The alarm apparatus of claim 1, further comprising:
    a buzzer connected to the controller; wherein
    the controller activates the buzzer when the controller activates the second visual indicator.

17. A method of alarming a driver of a vehicle, comprising the steps of:
    detecting a condition where to call attention of the driver;
    calling attention of the driver by a first visual indicator which is disposed in the vehicle at first; and
    calling attention of the driver by a second visual indicator, the second visual indicator being located inside the vehicle and separated from the first indicator and placed closer to the driver's sight than the first visual indicator under condition that the driver is facing ahead of the vehicle.

* * * * *